United States Patent [19]
Blättry et al.

[11] 3,868,120
[45] Feb. 25, 1975

[54] CHUCK

[75] Inventors: Hans Blättry, Meerbusch; Johann Lindemann, Hilden, both of Germany

[73] Assignee: Paul Forkardt Kommanditgesellschaft, Dusseldorf, Germany

[22] Filed: Oct. 2, 1973

[21] Appl. No.: 402,744

[30] Foreign Application Priority Data
Oct. 3, 1972 Germany............................ 2248403

[52] U.S. Cl. .............................................. 279/123
[51] Int. Cl. .......................................... B23b 31/16
[58] Field of Search.................... 279/123, 110, 121; 269/271, 284

[56] References Cited
UNITED STATES PATENTS

| | | | |
|---|---|---|---|
| 1,261,265 | 4/1918 | Miller | 279/123 |
| 2,777,704 | 1/1957 | Sloan | 279/123 |
| 3,494,627 | 2/1970 | Pirman | 279/123 X |

*Primary Examiner*—Gil Weidenfeld
*Attorney, Agent, or Firm*—Walter Becker

[57] ABSTRACT

A chuck in which there is a plurality of base jaws radially adjustably connected to the chuck body; the latter has detachably arranged therein a plurality of auxiliary jaws mounted on the base jaws; hook-shaped holding means are respectively connected to the base jaws and the respectively pertaining auxiliary jaws. In the operative position of the chuck, the holding means of each base jaw are in hooked engagement with the holding means for the pertaining auxiliary jaws to thereby prevent the respective auxiliary jaws from radially moving outwardly relative to the pertaining base jaws, clamping spring means operatively connected to the base jaws and respectively associated with the auxiliary jaws being provided for preventing the pertaining auxiliary jaws from accidentally axially moving relative to the pertaining base jaws.

15 Claims, 9 Drawing Figures

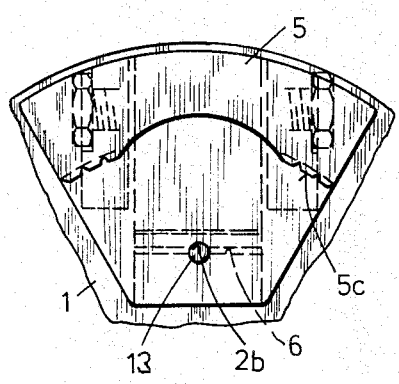
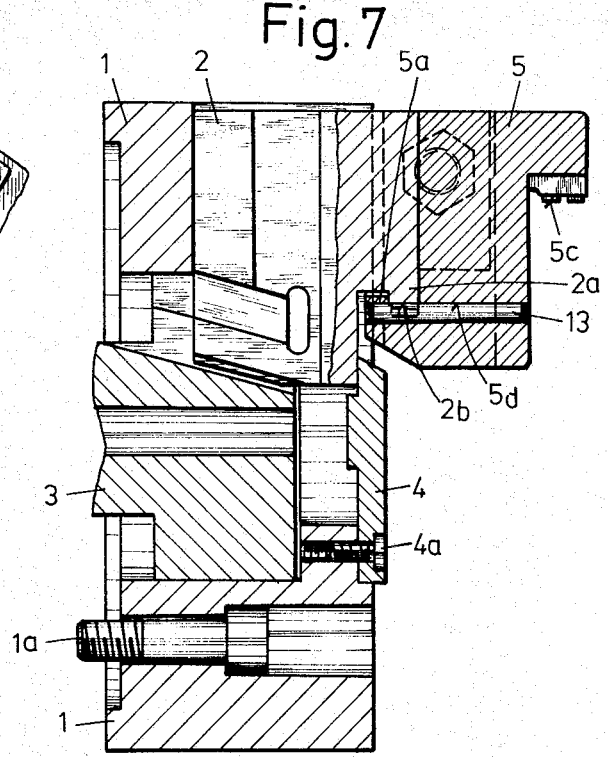
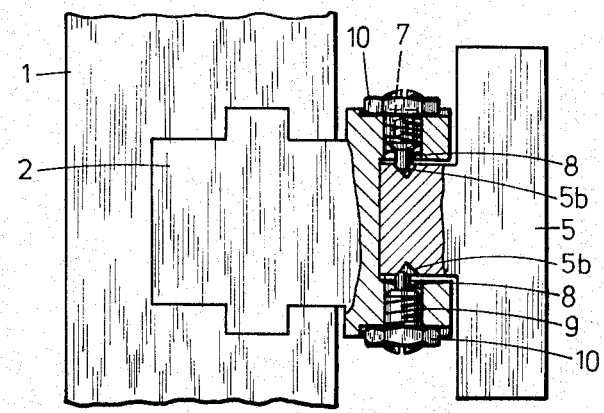

CHUCK

The present invention relates to a chuck with a plurality of clamping jaws which are radially movably guided in a chuck body. The clamping jaws comprise a base jaw and an auxiliary jaw or mountable jaw adaptable exchangeably to be connected to the base jaw. The auxiliary or mountable jaw is arranged in a recess provided in the end face of the base jaw, and when under the load of centrifugal forces and clamping forces, abuts an abutment surface.

With heretofore known chucks of the abovementioned type, the auxiliary jaws are connected to the base jaws by means of screws, while for each auxiliary jaw there is provided at least one screw, and in most instances two screws. This connection can be effected either directly by the screws connecting the auxiliary jaw to the base jaw or by clamping the auxiliary jaw in an undercut groove of the base jaw. With the heretofore known design of the last-mentioned type, the base jaw is provided with a dovetailed groove which is adapted to be subjected to a transverse clamping pressure and into which a corresponding clamping part of the auxiliary jaw is inserted.

The drawback of the heretofore known jaw connections consists primarily in that, for purposes of exchanging the auxiliary jaws, it is necessary for each jaw to withdraw or at least loosen one screw, and in most instances two screws, which screw or screws will then have to be again screwed in when the auxiliary jaw has been positioned. In particular, with machine tools having a plurality of spindles, as for instance multi-spindle automats, in this way stoppages or idling of the machines is inevitable, so that the manufacturing process is affected by these idling or stoppage periods. It is, therefore, an object of the present invention to provide a chuck of the above-mentioned general type in which the auxiliary jaws can be connected to the base jaws quickly and safely without employing jaw connecting screws.

It is another object of this invention to provide a chuck, as set forth in the preceding paragraph, which will be suitable for a great number of exchangeable jaw sets.

These objects and other objects and advantages of the invention will appear more clearly from the following specification in connection with the accompanying drawings, in which:

FIG. 7 represents a section through a third embodiment of the present invention.

FIG. 8 is a top view partially in section of the embodiment of FIG. 7.

FIG. 9 is an end view of a portion of FIG. 8 with an auxiliary jaw as seen from the right hand side of FIG. 7.

Figure 1:
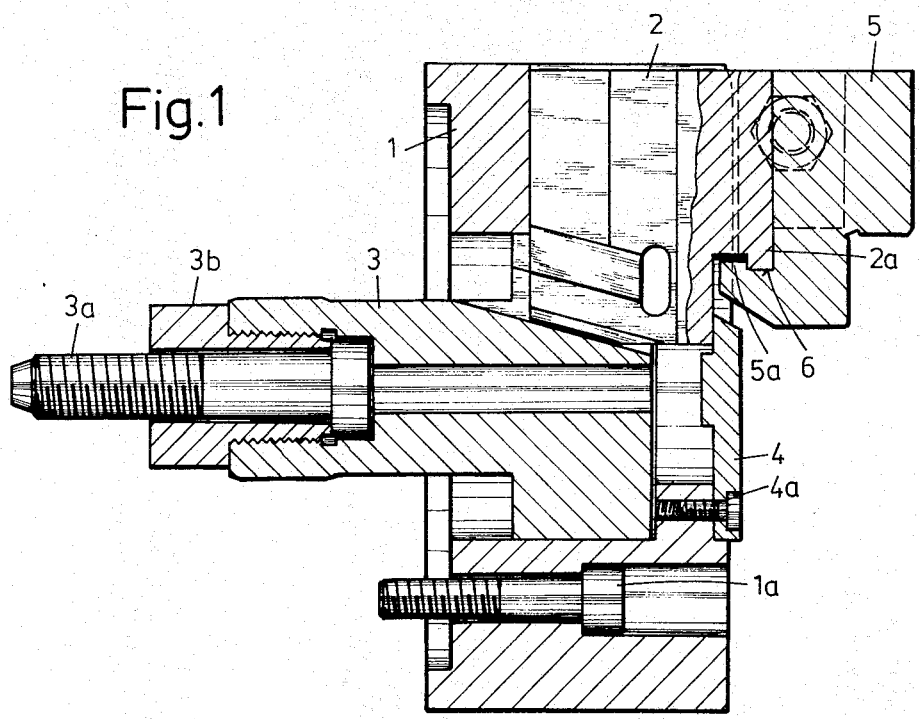
FIG. 1 is a longitudinal section through a first embodiment of the present invention.

The chuck according to the present invention is characterized primarily in that each auxiliary jaw is held in radial direction by holding strips or rails which engage each other in a hook-shaped manner and which are arranged at the inner end of the base jaw and of the auxiliary jaw, each auxiliary jaw being held in axial direction solely by the force of clamping springs.

In view of the design according to the present invention, the recess in the end face of the base jaw may be formed by a groove which extends over the entire length of the base jaw, and which has a rectangular cross section and is not undercut, so that the auxiliary jaws when overcoming the force exerted by the clamping spring can be removed toward the front and can be inserted from the front when the positively interengaged holding strips are slightly spaced from each other in radial direction. Thus, a chuck according to the invention, in addition to being of a simple design, permits a fast exchangeability of the auxiliary jaws which, due to the elimination of separate connecting elements, can easily be adjusted in order to be adapted to the respective work pieces to be chucked. In view of the positive transmission of the clamping forces on the radially inwardly located end of the base and auxiliary jaws, a favorable power transmission with negligibly small elasticity is obtained, so that a high chucking precision will be realized.

Due to the fact that each auxiliary jaw will abut an abutment surface produced with high precision and pertaining to the base jaw, the jaw sets intended for the chuck, according to the invention, may be produced on a similar chuck, for instance in the machine tool shop, without affecting the repeated chucking even of different sets of jaws. All auxiliary jaws can be used on different chucks of the same type without affecting their ability to run true. The abutment surface may be provided at any desired area of the base chuck. According to one feature of the invention, it is also possible to equip the interengaging holding strips or rails with an abutment surface for radially locating the auxiliary chuck. The holding rails may be designed either circular or straight and may with regard to the chuck body be designed in the manner of a chord.

According to a further feature of the invention, it is suggested to arrange the clamping springs on the base jaw and to respectively provide the clamping springs with pressure members for engagement with an arresting depression in the auxiliary jaw. This depression may be in the shape of a conical counter sink or may be in the form of a V-shaped groove. Expediently, at least two oppositely directed clamping springs may be provided on each base jaw.

With regard to the design of the clamping springs, it may be advantageous to arrange the same in an insert member which is connected in a transverse groove of the base jaw. Preferably, the force or thrust of the clamping springs is adjustable. To this end, it is suggested according to the present invention to arrange each clamping spring in the bore of a screw bolt which is adapted to be screwed into the base jaw or into the insert member, and which is adjustable and by means of a counter nut is arrestable.

In order to be able to connect to the base jaws not only auxiliary jaws which are in firm engagement with the base jaws, but also to be able to connect auxiliary jaws which are journalled in the manner of a pendulum and which are suitable in particular for machining easily deformable work pieces such as ball bearing rings, a further development of the invention is suggested which is characterized in that in the abutment surface of the holding strip of the base jaw there is provided an axially extending recess for a protrusion which protrudes from the counter surface of the auxiliary jaw. In this instance, the auxiliary jaw is in conformity with the present invention provided with two clamping surfaces for the work piece, which clamping surfaces are spaced from each other, while the auxiliary jaw is mounted on the base jaw, so as to be able to carry out a pendulum movement over a small angle.

By the replacement of the flat engagement between the holding strips on the base jaw and the auxiliary jaw by a type of edge bearing as it results from the axially extending recess in the abutment surface of the holding strip of the base jaw and from the protrusion projecting from the counter surface of the auxiliary jaw, a pendulum-like mounting is created for the auxiliary jaw without thereby eliminating the positive connection for transmitting centrifugal and clamping forces. Inasmuch as the engaged surface of the holding strip of the base jaw is reduced merely by the surface of the recess, the chuck according to the invention may also be employed for the rigid mounting of auxiliary jaws.

According to a further feature of the invention, it is suggested to design the recess with a semi-circular cross section and to employ as projection a pin which protrudes from the counter surface at least by half its length. This pin is preferably cylindrical and is arranged in a bore which extends through the auxiliary jaw in axial direction.

In view of the above-mentioned features, an extremely simple and relatively inexpensive construction of the bearing area for the pendulum-like suspension of the auxiliary jaws is created, so that the further development according to the present invention will, in spite of considerably widening the field of application of the chuck according to the invention, not result in any material increase in the cost of manufacture of the chuck.

Referring now to the drawings in detail, it will be noted that in all embodiments of the invention as shown in the drawings the chuck comprises a chuck body 1 which by means of connecting screws 1a is connected to a non-illustrated spindle of a machine tool. According to the illustrated embodiments, three base jaws 2 are with each embodiment of the invention movably guided in radial guiding means of the chuck body 1. These three base jaws 2 are adapted to be actuated by an axially movable clamping piston 3. The connection between the clamping piston 3 and the base jaws 2 is effected by means of an inclined wedge-shaped hook. The clamping piston 3 is by means of a pull screw 3a connected to a nonillustrated pull rod, said screw 3a being fixedly arranged on the clamping piston 3 by means of the bearing member 3b. The last-mentioned pull rod extends in the bore of the spindle. The front side of the chuck body 1 is closed by a cover 4, which by means of cover screws 4a is connected to the chuck body 1.

Each base jaw 2 is provided with an auxiliary jaw 5, which is inserted into a recess which has a rectangular cross section and which is provided in the end face of the base jaw 2. In radial direction, each auxiliary jaw 5 is held on the base jaw 2 by means of interengaging holding strips or rails 2a, 5a. The rails 2a, 5a, are respectively provided at the inner end of the base jaw 2 and auxiliary jaw 5 and positively engage each other.

Figure 6:
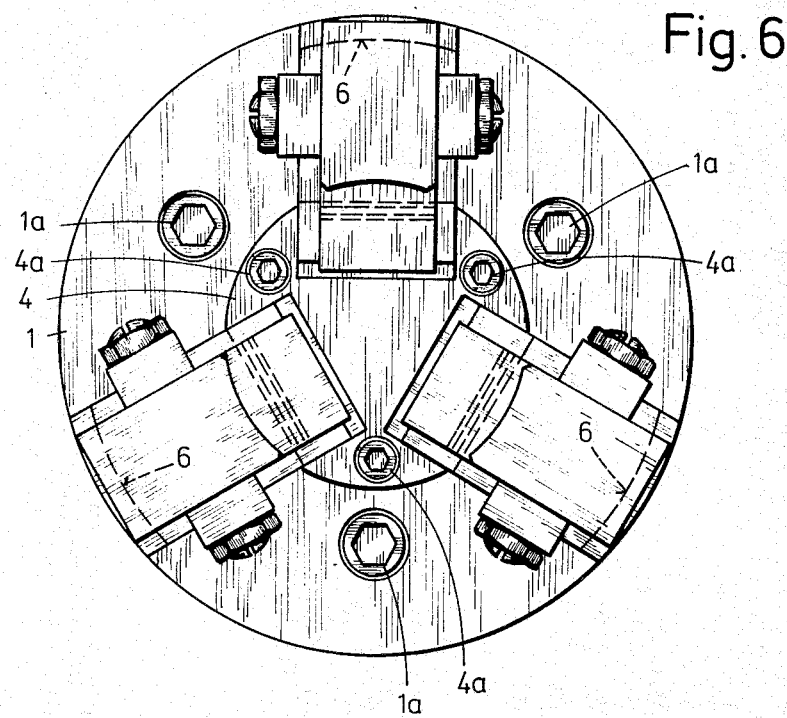
FIG. 6 is an end view of the chuck of FIG. 4 as seen from the right hand side of FIG. 4.
Figure 4:
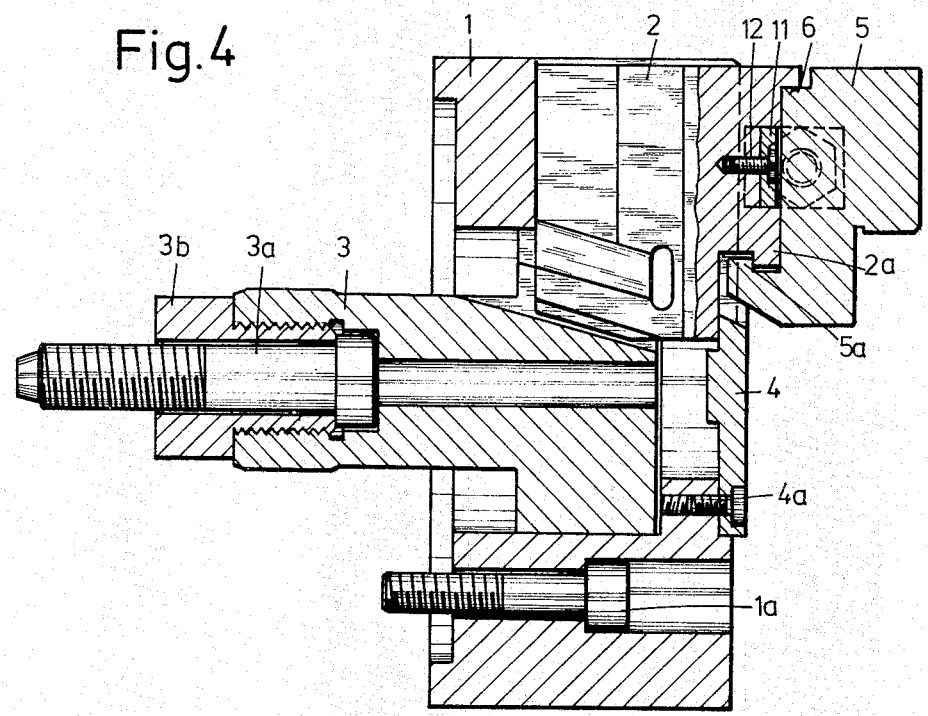
FIG. 4 shows a longitudinal section through a second embodiment of the chuck according to the invention.
Figure 5:
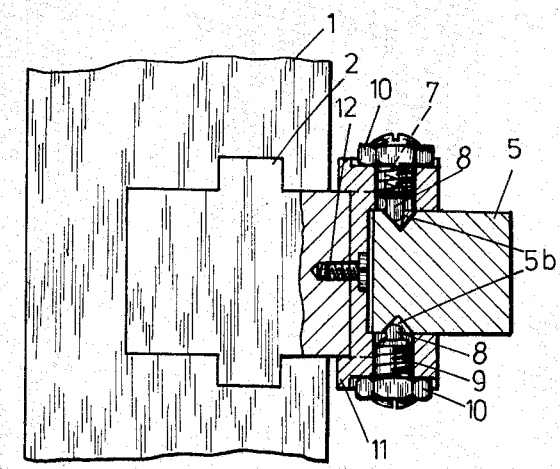
FIG. 5 is a top view partially in section of FIG. 4.

The radial locating of each auxiliary jaw 5 on the pertaining base jaw 2 is effected by means of an abutment surface 6, which is made circular by turning. According to the first embodiment, illustrated in FIGS. 1, 2, 3, the holding strip 2a of the base jaw 2 simultaneously serves as abutment surface 6, whereas with the embodiment according to FIGS. 4 – 6 a separate abutment surface 6 is provided on the radially outward part of the base jaws 2. According to this second embodiment, it is possible to design the holding strips as straight strips so that they are arranged in a manner of a chord with regard to the chuck body. Since the holding strips 2a, 5a with this embodiment do not serve as abutment surface 6, no high precision requirements have to be met in the radial direction, so that these holding strips can be prepared for instance by planing. With a practical design, it is of course possible that the inner abutment surface 6 for the auxiliary jaw, which in FIGS. 1 and 6 is circular, to be ground straight or in the form of a chord, while the auxiliary jaws engage these surfaces by the surfaces which are milled straight or planed straight.

While the radial locating of the auxiliary jaws 5 on the base jaws 2 is with regard to the centrifugal and clamping forces to be absorbed effected by the hook-shaped interengaging two holding strips 2a and 5a and by the abutment 6 with highest precision and with the possibility of transmitting large forces, the locating of the auxiliary jaws 5 on the base jaws 2 in axial direction is effected merely by clamping springs 7 which radially act upon the auxiliary jaws 5. These clamping springs 7 must prevent the auxiliary jaws 5 merely against an accidental dropping out. These clamping springs can easily be overcome in axial direction by inserting or pulling out the auxiliary jaws 5.

Figure 2:
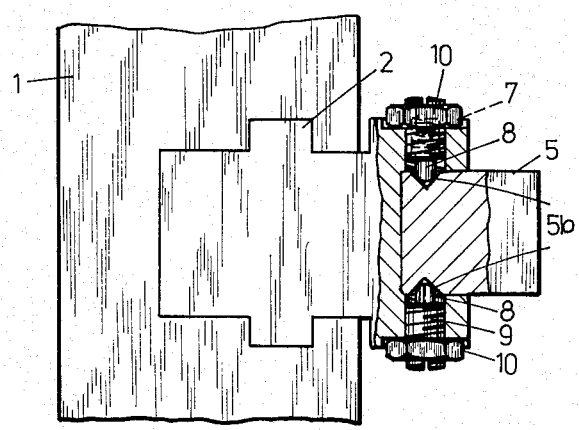
FIG. 2 represents a top view partially in section of the chuck shown in FIG. 1.
Figure 3:
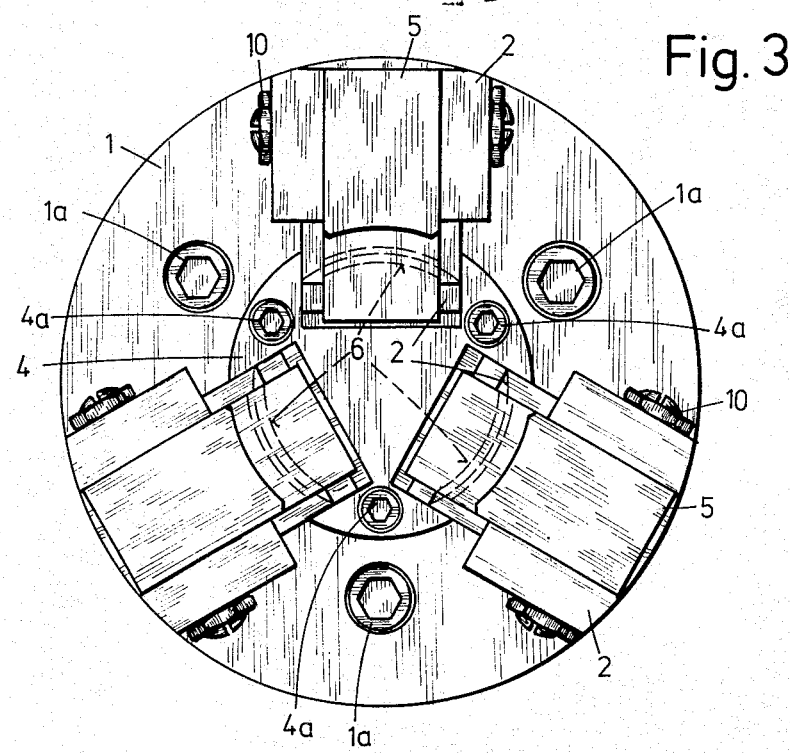
FIG. 3 represents an end view of the first embodiment of the invention as seen from the right hand side of FIG. 1.

With the embodiments illustrated in FIGS. 1, 2, 3, the clamping springs 7 are directly arranged in the base jaws 2 and more specifically two oppositely acting clamping springs 7 each are provided per one base jaw 2. According to the second embodiment of FIGS. 4 – 6, a specific insert member 11 is inserted into each base jaw 2. This member 11 comprises the clamping spring 7, and by means of a connecting screw 12 is screwed onto the base jaw 2.

In both instances the clamping springs 7 are respectively provided with pressure members 8 which cooperate with a conical depression 5b in the lateral surface of the auxiliary jaw 5. In order to permit an adjustment of the clamping springs 7, these clamping springs are respectively arranged in bores of screw bolts 9. Each screw bolt 9 is adapted to be screwed into a base jaw 2 or into the insert member 11 and is secured in its position by a counter nut 10. Depending on the depth at which the screw bolt 9 is screwed in, the force of the clamping spring 7 is changed.

For purposes of removing the auxiliary jaws 5, it is merely necessary to move the same slightly inwardly in radial direction while the chuck is at a standstill, so that the hook-shaped engagement between the holding strips 2a and 5a will be eliminated. Subsequently, the auxiliary jaws 5 are withdrawn forwardly in axial direction, while the forces of the clamping springs 7 are easily overcome. The insertion of a new set of auxiliary jaws 5 is effected in reverse sequence. The clamping springs 7, in view of their pressure members 8 engaging the conical depressions 5b in the auxiliary jaws 5, see to it that in addition to the axial arresting also a radial arresting is effected, which when the chuck is put into operation will bring about that the holding strips 2a and 5a safely engage each other in a positive manner. The engagement of the abutment surface 6 of base jaws 2 by the auxiliary jaws 5, as it is necessary for the precision of the chuck, is effected automatically by the centrifugal forces ocurring during the rotation of the chuck and by the clamping forces.

In order to obtain a pendulum-like mounting of the auxiliary jaw 5 equipped with two clamping surfaces 5c, the third embodiment of the invention has the abutment surface 6 of the base jaw 2 provided with an axially extending recess 2b, which serves for receiving a projection protruding from the counter surface of the auxiliary jaw 5. This projection is, with the embodiment of FIG. 3, designed as pin 13 which is mounted in an axially extending bore 5d of the auxiliary jaw 5 and of which at least one half protrudes from the counter surface. The pin 13 extending into the recess 2b thus represents a type of edge bearing for the auxiliary jaw 5 which is able to carry out a pendulum movement by a small angle inasmuch as its width is slightly less than the distance between the parts of the base jaw 2 which hold said jaw 5 in circumferential direction.

Also with the embodiment of FIGS. 7 – 9, the locating in radial direction of the auxiliary jaw 5 on the base jaw 2 is with regard to the centrifugal and clamping forces to be absorbed effected by the holding strips 2a and 5a engaging each other in a hook-shaped manner, and is furthermore effected by the pin 13 engaging the recess 2b of the abutment surface 6, with a maximum of precision and with the possibility of transmitting large forces. The locating of the auxiliary jaw 5 on the base jaw 2 in axial direction is again effected only by clamping springs 7 which radially act upon the auxiliary jaw 5 and prevent the same from accidentally dropping out.

It is, of course, to be understood that the present invention is by no means limited to the specific showing in the drawings, but also comprises any modifications within the scope of the appended claims.

What we claim is:

1. A chuck comprising a chuck body, a plurality of base raws radially movable in said body, means operatively connected to said jaws and movable in an axial direction of said chuck for radially adjusting said jaws, an auxillary jaw detachably received in a radial channel in each of said base jaws, hook-shaped holding means for holding the auxillary jaw on each of the base jaws and for preventing outward radial movement of said auxillary jaw relative to each of the base jaws, spring means connected to each of the base jaws for clamping the auxillary jaw to each of the base jaws and for preventing the auxillary jaw from undesired movement in the axial direction.

2. A chuck according to claim 1, in which each of the base jaws are provided with an abutment surface for radially locating the position of said auxiliary jaw.

3. A chuck according to claim 2, in which said holding means have a circular section.

4. A chuck according to claim 2, in which said holding means have a straight portion which with regard to said chuck body is designed as a chord.

5. A chuck according to claim 1, in which said clamping spring means are connected to the base jaws and are provided with a pressure member, said auxiliary jaw being provided with depression means adapted to be engaged by the pressure member.

6. A chuck according to claim 5, in which each of said depression means is formed by a conical depression.

7. A chuck according to claim 1, in which each base jaw has associated therewith at least two clamping spring means acting in a direction opposite and toward each other.

8. A chuck according to claim 7, in which each of said base jaws is provided with at least one transverse groove, and said clamping spring means including a spring biased detent member received in said at least one transverse groove to hold the auxillary jaw on each of said base jaws.

9. A chuck according to claim 1, which includes adjusting means for varying the pressure of said clamping spring means.

10. A chuck according to claim 1, in which each of said base jaws includes threaded bolt means threaded through the opposed walls of the radial channel of each of said base jaws, each of said bolt means having an axial bore for housing a spring biased detent, and nut means associated with said bolt means for locking same in a set position.

11. A chuck according to claim 8, in which each of said base jaws includes threaded body means threaded through the opposed walls of the radial channel of each of said base jaws, each of said bolt means having an axial bore for housing a spring biased detent, and nut means associated with said bolt means for locking same in a set position.

12. A chuck according to claim 2, in which the abutment surface of each of the base jaws has an axially extending recess, each of said auxiliary jaws has a protrusion received in said axially extending recess.

13. A chuck according to claim 12, in which said radial channel is wider than the portion of the auxillary jaw received therein and said auxillary jaw being pivotally associated with each of said base jaws to allow angular movement of the auxillary jaw relative to each of the base jaws.

14. A chuck according to claim 12, in which each of said recesses has a substantially circular cross section and in which each of said protrusions includes a pin being complementary to said circular cross section.

15. A chuck according to claim 14, in which each of said auxiliary jaws has an axial bore extending therethrough and having the respective pin retained therein.

* * * * *